United States Patent [19]

Noguchi et al.

[11] Patent Number: 5,346,870
[45] Date of Patent: Sep. 13, 1994

[54] ALUMINUM TITANATE CERAMIC AND PROCESS FOR PRODUCING THE SAME

[75] Inventors: Yasushi Noguchi, Nagoya; Shinichi Miwa, Tajimi; Kaname Fukao, Inuyama, all of Japan

[73] Assignee: NGK Insulators, Ltd., Nagoya, Japan

[21] Appl. No.: 933,222

[22] Filed: Aug. 21, 1992

[30] Foreign Application Priority Data

Aug. 28, 1991 [JP] Japan .................. 3-242641

[51] Int. Cl.$^5$ .................. C04B 35/46; C04B 35/48
[52] U.S. Cl. .................. 501/136; 501/5; 501/73; 501/112; 501/119; 501/127; 501/128; 501/134; 264/56
[58] Field of Search .................. 501/73, 112, 118, 119, 501/126, 127, 134, 136, 5, 128; 264/56

[56] References Cited

U.S. PATENT DOCUMENTS

| 4,327,188 | 4/1982 | Endo et al. | 501/134 |
|---|---|---|---|
| 4,483,944 | 11/1984 | Day et al. | 502/439 |
| 4,767,731 | 8/1988 | Asami et al. | 501/128 |
| 4,855,265 | 8/1989 | Day et al. | 501/128 |
| 4,895,815 | 1/1990 | Olapinski et al. | 501/134 |
| 5,066,626 | 11/1991 | Fukao et al. | 501/128 |

FOREIGN PATENT DOCUMENTS

| 133021A1 | 2/1985 | European Pat. Off. . |
|---|---|---|
| 0210813A3 | 2/1987 | European Pat. Off. . |
| 231006A3 | 8/1987 | European Pat. Off. . |
| 231006A2 | 8/1987 | European Pat. Off. . |
| 285312A2 | 10/1988 | European Pat. Off. . |
| 285312A3 | 10/1988 | European Pat. Off. . |
| 0336044A2 | 10/1989 | European Pat. Off. . |
| 360564A2 | 3/1990 | European Pat. Off. . |
| 372868A3 | 6/1990 | European Pat. Off. . |
| 372868A2 | 6/1990 | European Pat. Off. . |
| 1238376 | 4/1967 | Fed. Rep. of Germany . |
| 3725170A1 | 2/1989 | Fed. Rep. of Germany . |
| 3827646A1 | 2/1990 | Fed. Rep. of Germany . |
| 3915496C1 | 11/1990 | Fed. Rep. of Germany . |
| 4029166A1 | 1/1992 | Fed. Rep. of Germany . |
| 4130917A1 | 3/1992 | Fed. Rep. of Germany . |
| 2609021 | 7/1988 | France . |
| 57-3629 | 1/1982 | Japan . |
| 1-257165 | 10/1989 | Japan . |
| 2-258670 | 10/1990 | Japan . |

OTHER PUBLICATIONS

Pohlmann, H. J. et al. "Untersuchungen an Werkstoffen im System Al2O3–TiO2–SiO2", Ber. Dt. Keram. Ges. 52 (1975) Nr. 6. no month.
Derwent Publications, Ltd., Week 9048 AN 90-358154 & JP-A-2 258 670, Oct. 19, 1990.

Primary Examiner—Anthony Green
Assistant Examiner—Michael Marcheschi
Attorney, Agent, or Firm—Adduci, Mastriani, Schaumberg & Schill

[57] ABSTRACT

An aluminum titanate ceramic has as main crystalline phases, a crystalline phase of aluminum titanate and a solid solution thereof, a crystalline phase of mullite and a crystalline phase of rare earth titanate represented by $RE_2Ti_2O_7$ (RE represents Y, Yb, Er, Dy, Ho, Tm or Lu). The aluminum titanate ceramic is superior in casting property and has high heat cycle durability.

5 Claims, 4 Drawing Sheets

ALUMINUM TITANATE CERAMIC AND PROCESS FOR PRODUCING THE SAME

BACKGROUND OF THE INVENTION AND RELATED ART STATEMENT

The present invention relates to an aluminum titanate ceramic and a process for producing said aluminum titanate ceramic. More particularly, the present invention relates to an aluminum titanate ceramic used in, for example, a head port liner, an exhaust manifold liner (these liners are for the heat insulation of the inside of an engine exhaust pipe) and a catalytic converter, as well as to a process for producing said aluminum titanate ceramic.

A ceramic using aluminum titanate as a base material has a low thermal expansion coefficient and a small Young's modulus. Hence, it is suitable for use in various members used under severe conditions in which the members are required to have high thermal shock resistance and low thermal expansion, for example, in a head port liner, an exhaust manifold liner (these liners are for the heat insulation of the inside of gasoline engine exhaust pipe) and in a catalytic converter.

It is known that in ordinary aluminum titanate materials (aluminum titanate material is hereinafter referred to as AT material), the Young's modulus and the strength are generally proportional to each other. That is, as the strength is higher, the Young's modulus is larger. Conversely, as the strength is lower, the Young's modulus is smaller. This is because when an AT material has a low strength, the crystal grains of the AT material are generally large and a number of cracks exist between the grain boundaries, allowing the AT material to be easily deflected and lowering its strength. Many of the conventional AT materials have a Young's modulus of about 2,000 $Kgf/mm^2$ or more and a bending strength of 2–5 $Kgf/mm^2$.

Various improvements have been made for AT materials, depending upon their applications, by adding additives, etc. thereto. In this connection, it was proposed to add a rare earth oxide in order to suppress the decomposition of aluminum titanate at high temperatures and impart a high strength.

For example, Japanese Patent Publication No.3629/1982 proposes a low-thermal-expansion ceramic comprising, as a main phase, an aluminum titanate containing at least one rare earth element selected from the group consisting of Y, La and Ce. Japanese Patent Application Kokai (Laid-Open) No. 257165/1989 proposes an aluminum titanate containing a rare earth oxide, mullite and iron titanate, which is stable even at high temperatures of about 1,000°–1,300° C. Japanese Patent Application Kokai (Laid-Open) No. 258670/1990 proposes a low-thermal-expansion ceramic consisting of an aluminum titanate-magnesium titanate solid solution and Yttrium titanate, which is stable at high temperatures.

The ceramics proposed in Japanese Patent Publication No. 3629/1982 and Japanese Patent Application Kokai (Laid-Open) No. 258670/1990, contain rare earth element(s). However, they have a small number of cracks and consequently have a high strength and a high Young's modulus; when used as a casting material for metal they give low deflection and are unable to absorb the strain applied, that is, they are inferior in casting; when subjected to a heat cycle wherein high temperature heating and cooling are repeated, new cracks appear at the grain boundaries and thereby their strengths are deteriorated.

The aluminum titanate proposed in Japanese Patent Application Kokai (Laid-Open) No. 257165/1989 contains mullite and a rare earth oxide. However, it is inferior in casting similarly to the above ceramics, and further has insufficient heat cycle durability because it has cracks in the crystal grains and at the grain boundaries.

SUMMARY OF THE INVENTION

The present invention aims at providing an AT material which has eliminated the above-mentioned drawbacks of conventional AT materials and which has superior casting property and high heat cycle durability.

According to the present invention, there is provided an aluminum titanate Ceramic comprising, as main crystalline phases, a crystalline phase of aluminum titanate and a solid solution thereof, a crystalline phase of mullite and a crystalline phase of rare earth titanate represented by $RE_2Ti_2O_7$ (RE represents Y, Yb, Er, Dy, Ho, Tm or Lu).

According to the present invention, there is further provided a process for producing an aluminum titanate which comprises preparing a plurality of raw material powders of 5 μm or less in average particle diameter, selected from the group consisting of an $Al_2O_3$ source, a $TiO_2$ source, a $SiO_2$ source, a $Fe_2O_3$ source, a MgO source, a rare earth element source, a mullite source and aluminum titanate, mixing the raw material powders to obtain a mixture, shaping the mixture to obtain a shaped body, drying the shaped body to obtain a dried body and then sintering the dried body.

The aluminum titanate ceramic of the present invention has excellent casting property and high heat cycle durability because the aluminum titanate ceramic is constituted as above and comprises, as main crystalline phases, a crystalline phase of aluminum titanate and a solid solution thereof, a crystalline phase of mullite and a crystalline phase of rare earth titanate represented by $RE_2Ti_2O_7$ (RE represents Y, Yb, Er, Dy, Ho, Tm or Lu).

The reason is not clear but is presumed to be as follows. That is, when a sintered aluminum titanate material contains mullite and a rare earth titanate therein, the rare earth titanate takes the form of a dendrite structure and exists at the boundaries between aluminum titanate crystals and mullite crystals and binds them strongly; when such a sintered aluminum titanate material is subjected to heat cycle and undergoes thermal stress, no cracks appear at the grain boundaries which are ordinarily generated at such grain boundaries, and cracks appear in the aluminum titanate crystals and the mullite crystals and these cracks contribute to the improvement of casting property; meanwhile, since the bonding between crystals is strong as mentioned above, no cracks appears at the grain boundaries during heat cycle and thereby high heat cycle durability is obtained.

In the present invention, the use of fine powder starting materials of 5 μm or less in average particle diameter enables the production of intended aluminum titanate ceramic because the use gives rise to (1) active reaction between $TiO_2$ and rare earth compound and (2) consequent formation of rare earth titanate of dendrite structure at grain boundaries.

The crystalline phases in the present aluminum titanate ceramic consist mainly of a crystalline phase of aluminum titanate and its solid solution, a mullite crystalline phase and a rare earth titanate crystalline phase. The aluminum titanate ceramic of the present invention may further comprise other crystalline phases of rutile, corundum, etc.

DETAILED DESCRIPTION OF THE INVENTION

Figure 1:
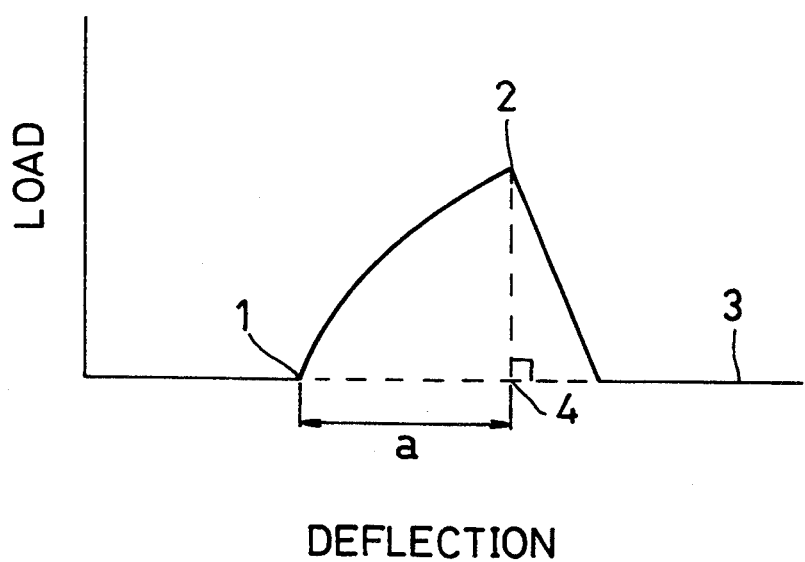
FIG. 1 shows a relation between deflection and load in a four-point bending strength test (JIS R 1601), of a ceramic sample.

The basic components constituting the aluminum titanate ceramic of the present invention are six components of $Al_2O_3$, $TiO_2$, $SiO_2$ $Fe_2O_3$, MgO and $RE_2O_3$, and the main crystalline phases of the present aluminum titanate ceramic consist of three phases of aluminum titanate ($Al_2TiO_5$), mullite ($3Al_2O_3 \cdot 2SiO_2$) and rare earth titanate ($RE_2Ti_2O_7$). At least part of the aluminum titanate phase is a solid solution of aluminum titanate. The RE of $RE_2Ti_2O_7$ is a rare earth element selected from Y, Yb, Er, Dy, Ho, Tm and Lu and does not refer to any other rare earth element. The rare earth elements other than Y, Yb, Er, Dy, Ho, Tm and Lu, each have large ionic radius and are unable to form a rare earth titanate, and vitrify at grain boundaries, making it impossible to obtain an intended AT material, and therefore are not used in the present invention.

That the aluminum titanate ceramic of the present invention is composed mainly of the above-mentioned three crystalline phases and one of them is a $RE_2Ti_2O_7$ crystalline phase, is clear from the X-ray diffraction patterns of the present Examples shown in FIG. 2 and the scanning type electron micrograph of the present Example shown in FIG. 3, both shown later.

The composition of the present aluminum titanate ceramic, when expressed on the basis of oxides, consists of 40–60% by weight of $Al_2O_3$, 30–45% by weight of $TiO_2$, 1–10% by weight of $SiO_2$, 0–4% by weight of $Fe_2O_3$, 0.1–1.5% by weight of MgO and 0.1–10% by weight of $RE_2O_3$. When the content of each oxide component is outside the above range, it is impossible to obtain an aluminum titanate ceramic superior both in casting property and heat cycle durability. Particularly when the content of $RE_2O_3$ is less than 0.1% by weight, the resulting aluminum titanate ceramic has inferior heat cycle durability.

The source (raw material) of each oxide component is described. As the source for $Al_2O_3$, there can be used, for example, α-alumina, calcined bauxite, aluminum sulfate, aluminum chloride and aluminum hydroxide. As the source for $TiO_2$, there can be used, for example, rutile and anatase. As the source for $SiO_2$, there can be used, for example, silica glass, kaolin, mullite and quartz. As the source for MgO there can be used, for example, magnesite, magnesium nitrate and magnesium oxide. As the source for $RE_2O_3$, there can be used, for example, the oxides, chlorides, carbonates, nitrates and hydroxides of the above-mentioned rare earth elements.

As the source for $Al_2TiO_5$, there can be used (A) an aluminum titanate powder obtained by wet- or dry-blending the above-mentioned $Al_2O_3$ source and $TiO_2$ source and then calcining and grinding the blend, or (B) an aluminum titanate obtained by subjecting an aluminum- and titanium-containing solution to synthesis and calcination. The $Al_2TiO_5$ source may contain at least one oxide selected from $SiO_2$, $Fe_2O_3$, MgO and $RE_2O_3$.

The raw materials used in the present invention contain the above-mentioned $Al_2TiO_5$ source in an amount of preferably 5% by weight or more, more preferably 20% by weight or more based on all the raw materials.

In the present invention, the raw materials each in fine powdery state are mixed in the above composition, then shaped in a desired form, and sintered to obtain a low-thermal-expansion ceramic. In this case, the raw materials, particularly the $TiO_2$ source and $Al_2TiO_5$ source, preferably have an average particle diameter of about 5 μm or less. When the average particle diameters of the raw materials are larger than 5 μm, the reactivity between the raw materials is low and no rare earth titanate is precipitated, giving an aluminum titanate ceramic of inferior heat cycle durability.

As the method for shaping, there can be used any known shaping method such as hot pressing, cast molding, rubber pressing or the like. The temperature for sintering can be about 1,400°–1,650° C. similarly to the temperature employed for sintering of ordinary ceramics. In the shaping and sintering, there may be appropriately added a shaping aid, a deflocculant, a sintering aid, etc.

The present invention is hereinafter described in more detail by way of Examples. However, the present invention is in no way restricted to the following Examples.

In the Examples, breaking strain and heat cycle durability were measured according to the following methods.

(1) Breaking strain

Was measured according to the same test method as that used for measurement of the four-point bending strength of ceramics, specified by JIS R 1601. That is, For a sample having a thickness "t" (mm), the deflection shown by the sample during a period from the start of load application to the destruction of the sample was taken, in FIG. 1 showing a relation between deflection and load, as a length "a" (mm) from a point 1 (start of load application) to a point 4 (an intersection between a base line 3 and a perpendicular drawn from a destruction point 2 to the base line 3; then, the breaking strain of the sample was calculated from "a" and "t" using the following formula.

Breaking strain = 6t.a/1000

Incidentally, this breaking strain is a quotient when bending strength is divided by Young's modulus determined from the deflection at destruction point. A larger breaking strain gives superior casting property,

(2) Heat cycle durability

A sample having a length of $L_\phi$(mm) was heated for 20 minutes in a furnace of 900° C., then taken out and cooled by air flow for 10 minutes. This heat cycle procedure was repeated 600 times. Thereafter, the length $L_1$ (mm) of the sample was measured.

The sample was also measured for four-point bending strengths $\sigma_\phi$ (before heat cycle) and $\sigma_1$ (after heat cycle) by JIS R 1601.

From the thus obtained $L_{100}$, $L_1$, $\sigma_\phi$ and $\sigma_1$, the heat cycle dimensional change (%) and heat cycle strength deterioration (%) of the sample were calculated using the following formulas.

Heat cycle dimensional change
(%)=$[(L_1-L_\phi)/L_\phi]\times 100$

Heat cycle strength deterioration
(%)=$[(\sigma_1-\sigma_\phi)/\sigma_{100}]\times 100$

EXAMPLES 1-4

The raw material fine powders shown in Table 1 were weighed so as to give a given composition. Thereto were added 22% by weight of water and 0.5% by weight of a polyacrylic acid type deflocculant. The mixture was stirred in a pot mill for 5 hours to obtain a uniform blend. To the blend was added 1.5% by weight of a binder, and the mixture was stirred and degassed under vacuum. The resulting blend was subjected to cast molding using a gypsum mold to obtain a shaped material.

The shaped material was calcined at a temperature shown in Table i under normal pressure to obtain four sintered AT materials.

Figure 2:
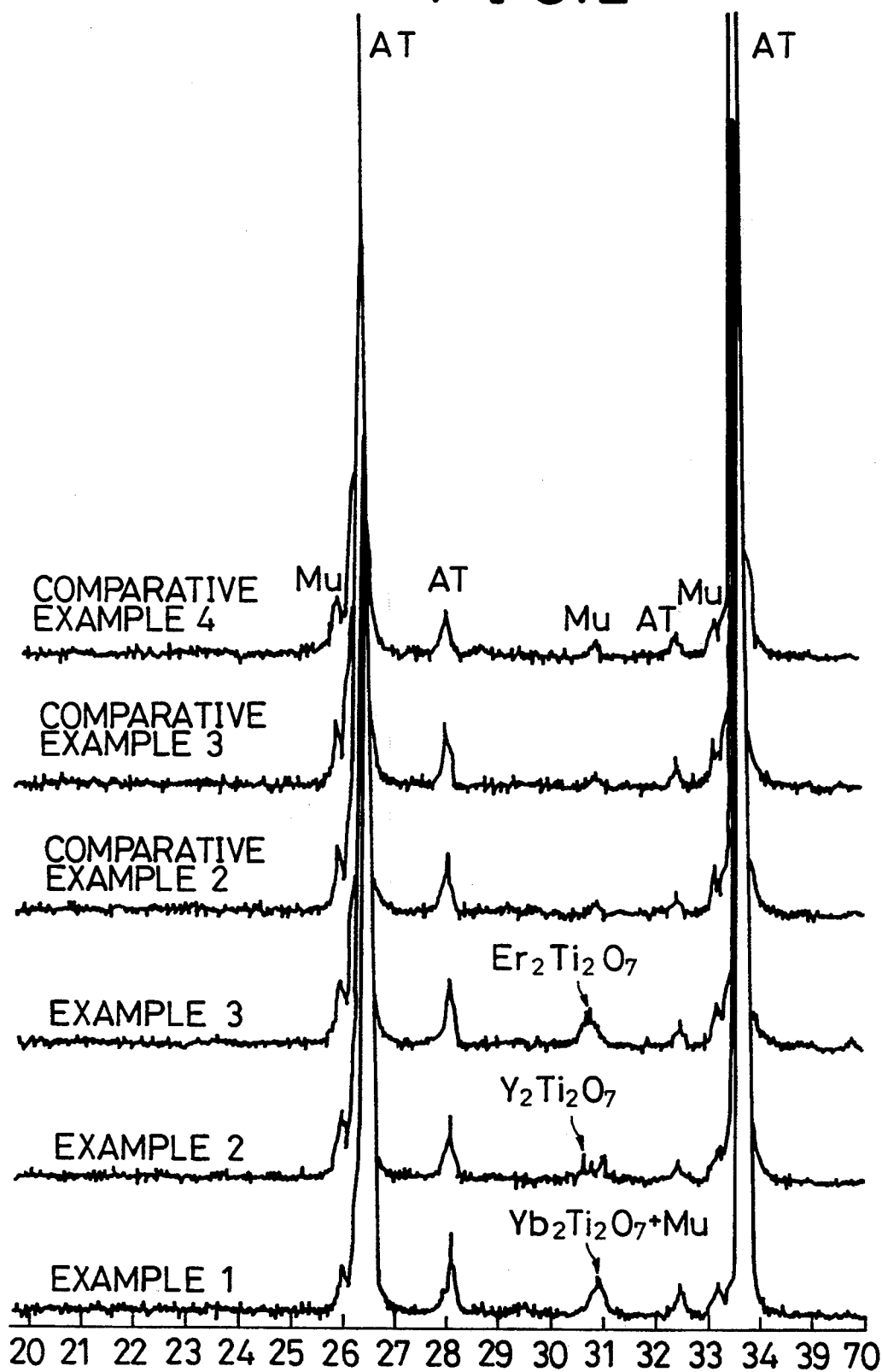
FIG. 2 shows X-ray diffraction patterns of the sintered AT materials obtained in Examples and Comparative Examples.

The X-ray diffraction patterns of the sintered AT materials obtained in Examples 1-3 are shown in FIG. 2. As is clear from FIG. 2, there is present in each pattern the crystalline phase of a rare earth titanate oxide, i.e., $Yb_2Ti_2O_7$ in Example 1, $Y_2Ti_2O_7$ in Example 2 and $Er_2Ti_2O_7$ in Example 3.

Figure 3:
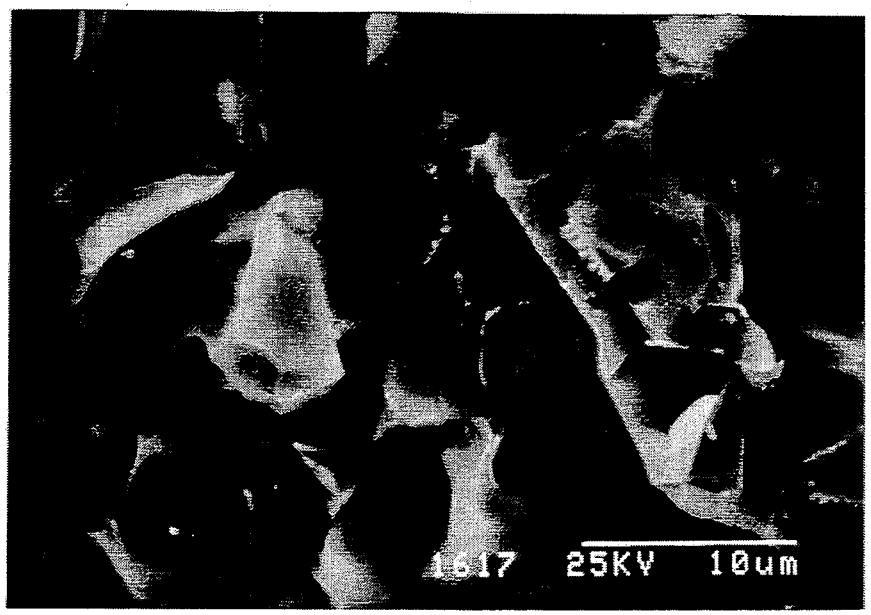
FIG. 3 shows a scanning type electron micrograph (magnification =800) showing the crystal structure of the sintered AT material obtained in one Example of the present invention.

The scanning type electron micrograph of the crystal structure of the sintered AT material obtained in FIG. 1 is shown in FIG. 3. In FIG. 3, a crystalline phase of $Yb_2Ti_2O_7$ shining in a white color is observed on the surfaces of crystal grains, which confirms the presence of a crystalline phase of rare earth titanate oxide similarly to the case of the X-ray diffraction pattern.

Each of the sintered AT materials was further measured for breaking strain and heat cycle durability. The results are shown in Table 1.

The "A" shown in Table 1 as an $Al_2TiO_5$ source is a sintered ground aluminum titanate powder of 5 μm or less obtained by dry-mixing an $Al_2O_3$ source and a $TiO_2$ source and subjecting the blend to calcination and sintering. The "B" shown in Table 1 also as an $Al_2TiO_5$ source is an aluminum titanate powder of 1 μm obtained by subjecting an aqueous solution of an $Al_2O_3$ source and a $TiO_2$ source to synthesis and calcination. Each of the raw material fine powders used had the following average particle diameter: α-alumina=about 1.7 μm, rutile=about 0.2 μm, magnesite=about 4.3 μm, silica glass=about 3 μm, mullite=about 4 μm, and each rare earth oxide=about 5 μm.

TABLE 1

|  | Example | | | |
|---|---|---|---|---|
|  | 1 | 2 | 3 | 4 |
| Raw materials | | | | |
| $Al_2O_3$ source | α-Alumina | α-Alumina | α-Alumina | α-Alumina |
| $TiO_2$ source | Rutile | Rutile | Rutile | Rutile |
| $Al_2TiO_5$ source | A | A | A | A |
| $SiO_2$ source | Silica glass | Silica glass | Silica glass | Silica glass |
| $Fe_2O_3$ source | — | — | — | — |
| MgO source | Magnesite | Magnesite | Magnesite | Magnesite |
| Rare earth source | $Yb_2O_3$ | $Y_2O_3$ | $Er_2O_3$ | $Dy_2(CO_3)_3$ |
| Mullite source | Mullite | Mullite | Mullite | Mullite |
| Composition (% by weight) | | | | |
| $Al_2O_3$ | 57 | 57 | 57 | 57 |
| $TiO_2$ | 36 | 36 | 36 | 36 |
| $SiO_2$ | 6 | 6 | 6 | 6 |
| $Fe_2O_3$ | 0 | 0 | 0 | 0 |
| MgO | 0.5 | 0.5 | 0.5 | 0.5 |
| $RE_2O_3$ | 0.5 | 0.5 | 0.5 | 0.5 |
| $TiO_2$ particle size $D_{50}$ (μm) | 0.2 | 0.2 | 0.2 | 0.2 |
| $Al_2TiO_5$ particle size $D_{50}$ (μm) | 1.0 | 1.0 | 1.0 | 1.0 |
| Sintering temperature (°C.) | 1500 | 1500 | 1500 | 1500 |
| Rare earth crystalline phase | $Yb_2Ti_2O_7$ | $Y_2Ti_2O_7$ | $Er_2Ti_2O_7$ | $Dy_2Ti_2O_7$ |
| Breaking strain ($\times 10^{-3}$) | 6.0 | 5.4 | 6.0 | 5.3 |
| 4-Point bending strength (Kgf/mm$^2$) | 2.4 | 2.4 | 2.5 | 2.8 |
| Heat cycle dimensional change (%) | 0.05 | 0.06 | 0.04 | 0.03 |
| Heat cycle strength deterioration (%) | −20 | −12 | −11 | −13 |

EXAMPLES 5-8

The raw material fine powders shown in Table 2 were weighed so as to give a given composition and subjected to the same procedure as in Example 1 to obtain four sintered AT materials. Each of the raw material fine powders used had the same average particle diameters as in Example 1.

Each of the sintered AT materials obtained was measured for breaking strain and heat cycle durability. The results are shown in Table 2. In Table 2, the "A" and "B" shown each as an $Al_2TiO_5$ source are the same as in Table 1.

TABLE 2

|  | Example | | | |
|---|---|---|---|---|
|  | 5 | 6 | 7 | 8 |
| Raw materials | | | | |
| $Al_2O_3$ source | α-Alumina | α-Alumina | α-Alumina | α-Alumina |

TABLE 2-continued

|  | Example | | | |
|---|---|---|---|---|
|  | 5 | 6 | 7 | 8 |
| $TiO_2$ source | Rutile | Rutile | Rutile | Rutile |
| $Al_2TiO_5$ source | A | A | A | A |
| $SiO_2$ source | Silica glass | Silica glass | Silica glass | Silica glass |
| $Fe_2O_3$ source | — | — | — | — |
| MgO source | Magnesite | Magnesite | Magnesite | Magnesite |
| Rare earth source | $Ho_2Cl_3$ | $Tm(OH)_3$ | $Lu_2(NO_3)_3$ | $Yb_2O_3$ |
| Mullite source | Mullite | Mullite | Mullite | Mullite |
| Composition (% by weight) | | | | |
| $Al_2O_3$ | 57 | 57 | 57 | 57.2 |
| $TiO_2$ | 36 | 36 | 36 | 36.2 |
| $SiO_2$ | 6 | 6 | 6 | 6 |
| $Fe_2O_3$ | 0 | 0 | 0 | 0 |
| MgO | 0.5 | 0.5 | 0.5 | 0.5 |
| $RE_2O_3$ | 0.5 | 0.5 | 0.5 | 0.1 |
| $TiO_2$ particle size $D_{50}$ (μm) | 0.2 | 0.2 | 0.2 | 0.2 |
| $Al_2TiO_5$ particle size $D_{50}$ (μm) | 1.0 | 1.0 | 1.0 | 1.0 |
| Sintering temperature (°C.) | 1500 | 1500 | 1500 | 1500 |
| Rare earth crystalline phase | $Ho_2Ti_2O_7$ | $Tm_2Ti_2O_7$ | $Lu_2Ti_2O_7$ | $Yb_2Ti_2O_7$ |
| Breaking strain ($\times 10^{-3}$) | 5.9 | 5.6 | 5.7 | 6.5 |
| 4-Point bending strength ($Kgf/mm^2$) | 2.4 | 2.8 | 2.3 | 2.1 |
| Heat cycle dimensional change (%) | 0.10 | 0.11 | 0.04 | 0.24 |
| Heat cycle strength deterioration (%) | −10 | −15 | −12 | −4 |

EXAMPLES 9-12

The raw material fine powders shown in Table 3 were weighed so as to give a given composition and subjected to the same procedure as in Example 1 to obtain four sintered AT materials. Each of the raw material fine powders used had the same average particle diameters as in Example 1.

Each of the sintered AT materials obtained was measured for breaking strain and heat cycle durability. The results are shown in Table 3. In Table 3, the "A" and "B" shown each as an $Al_2TiO_5$ source are the same as in Table 1.

EXAMPLES 13-16

The raw material fine powders shown in Table 4 were weighed so as to give a given composition and subjected to the same procedure as in Example 1 to obtain four sintered AT materials. Each of the raw material fine powders used had the same average particle diameters as in Example 1.

Each of the sintered AT materials obtained was measured for breaking strain and heat cycle durability. The results are shown in Table 4. In Table 4, the "A" and "B" shown each as an $Al_2TiO_5$ source are the same as in Table 1.

TABLE 3

|  | Example | | | |
|---|---|---|---|---|
|  | 9 | 10 | 11 | 12 |
| Raw materials | | | | |
| $Al_2O_3$ source | α-Alumina | α-Alumina | Calcined bauxite | — |
| $TiO_2$ source | Rutile | Rutile | Anatase | Rutile |
| $Al_2TiO_5$ source | A | A | B | B |
| $SiO_2$ source | Silica glass | Silica glass | Clay | Silica glass |
| $Fe_2O_3$ source | — | — | Red iron oxide | Ilmenite |
| MgO source | Magnesite | Magnesite | MgO | Magnesite |
| Rare earth source | $Yb_2O_3$ | $Yb_2O_3$ | $YbCl_3$ | $Er_2O_3$ |
| Mullite source | Mullite | Mullite | Kaolin | Mullite |
| Composition (% by weight) | | | | |
| $Al_2O_3$ | 56.2 | 52 | 57 | 50 |
| $TiO_2$ | 35.3 | 32.5 | 33 | 42 |
| $SiO_2$ | 6 | 5 | 8 | 5 |
| $Fe_2O_3$ | 0 | 0 | 1.0 | 2.0 |
| MgO | 0.5 | 0.5 | — | 0.5 |
| $RE_2O_3$ | 2.0 | 10 | 1.0 | 0.5 |
| $TiO_2$ particle size $D_{50}$ (μm) | 0.2 | 0.2 | 0.4 | — |
| $Al_2TiO_5$ particle size $D_{50}$ (μm) | 1.0 | 1.0 | 2.0 | 2.0 |
| Sintering temperature (°C.) | 1500 | 1500 | 1400 | 1500 |
| Rare earth crystalline phase | $Yb_2Ti_2O_7$ | $Yb_2Ti_2O_7$ | $Yb_2Ti_2O_7$ | $Er_2Ti_2O_7$ |
| Breaking strain ($\times 10^{-3}$) | 5.8 | 5.3 | 5.8 | 6.1 |
| 4-Point bending strength ($Kgf/mm^2$) | 2.7 | 3.0 | 2.8 | 3.1 |
| Heat cycle dimensional change (%) | 0.05 | 0.05 | 0.14 | 0.13 |
| Heat cycle strength deterioration (%) | −18 | −16 | −11 | −4 |

TABLE 4

|  | Example | | | |
|---|---|---|---|---|
|  | 13 | 14 | 15 | 16 |
| Raw materials | | | | |
| $Al_2O_3$ source | γ-Alumina | $Al_2(SO_4)_3$ | $Al(OH)_3$ | $AlCl_3$ |
| $TiO_2$ source | Anatase | Rutile | Rutile | Rutile |

TABLE 4-continued

| | Example | | | |
|---|---|---|---|---|
| | 13 | 14 | 15 | 16 |
| Al$_2$TiO$_5$ source | B | B | B | B |
| SiO$_2$ source | Quartz | Silica glass | Silica glass | Silica glass |
| Fe$_2$O$_3$ source | Fe(NO$_3$)$_3$ | Ilmenite | FeCl$_3$ | Fe(OH)$_3$ |
| MgO source | MgCl$_2$ | Mg(NO$_3$)$_3$ | MgO | Magnesite |
| Rare earth source | Y(NO$_3$)$_3$ | Er$_2$O$_3$ | Er$_2$O$_3$ | Er$_2$O$_3$ |
| Mullite source | Al$_2$O$_3$ + SiO$_2$ | Mullite | Mullite | Mullite |
| Composition (% by weight) | | | | |
| Al$_2$O$_3$ | 57 | 40 | 60 | 51 |
| TiO$_2$ | 30 | 41 | 30 | 45 |
| SiO$_2$ | 10 | 10 | 7 | 1 |
| Fe$_2$O$_3$ | — | 4 | 0 | 1 |
| MgO | 1.0 | 0.1 | 1.5 | 1 |
| RE$_2$O$_3$ | 2.0 | 4.9 | 1.5 | 1 |
| TiO$_2$ particle size D$_{50}$ (μm) | 1.0 | 0.2 | 0.2 | 0.2 |
| Al$_2$TiO$_5$ particle size D$_{50}$ (μm) | 2.0 | 2.0 | 2.0 | 2.0 |
| Sintering temperature (°C.) | 1600 | 1550 | 1550 | 1550 |
| Rare earth crystalline phase | Y$_2$Ti$_2$O$_7$ | Er$_2$Ti$_2$O$_7$ | Er$_2$Ti$_2$O$_7$ | Er$_2$Ti$_2$O$_7$ |
| Breaking strain ($\times 10^{-3}$) | 5.4 | 5.2 | 5.5 | 5.7 |
| 4-Point bending strength (Kgf/mm$^2$) | 3.4 | 2.2 | 2.4 | 1.8 |
| Heat cycle dimensional change (%) | 0.09 | 0.15 | 0.16 | 0.19 |
| Heat cycle strength deterioration (%) | −8 | −9 | −14 | −10 |

COMPARATIVE EXAMPLES 1–7

The raw material fine powders shown in Table 5 or 6 were weighed so as to give a given composition and subjected to the same procedure as in Example 1 to obtain sintered AT materials. Incidentally, the sintered AT material of Comparative Example 6 was obtained by the above-mentioned process described in Japanese Patent Application Kokai (Laid-Open) No. 257165/1989, and the sintered AT material of Comparative Example 7 was obtained by the above-mentioned process described in Japanese Patent Application Kokai (Laid-Open) No. 258670/1990.

The X-ray diffraction patterns of the sintered AT materials obtained in Comparative Examples 2–4 are shown in FIG. 2. As is clear from FIG. 2, when a rare earth oxide of Pr, Nd or Sm was used, no peak for crystalline phase of rare earth titanate was observed, which indicates that no crystalline phase of rare earth titanate was formed.

Figure 4:
FIG. 4 shows a scanning type electron micrograph (magnification =800) showing the crystal structure of the sintered AT material obtained in one Comparative Example of the present invention.

The scanning type electron micrograph of the crystal structure of the sintered AT material obtained in Comparative Example 2 is shown in FIG. 4. In FIG. 4, unlike the case of FIG. 3, there is no area shining in a white color and the presence of Pr$_2$Ti$_2$O$_7$ crystalline phase was not confirmed.

The sintered AT materials obtained were measured also for breaking strain and heat cycle durability. The results are shown in Tables 5 and 6. In Tables 5 and 6, the "A" and "B" shown each as an Al$_2$TiO$_5$ source are the same as in Table 1.

As is clear from the above Examples and Comparative Examples, the sintered AT materials of the present invention have breaking strains equivalent or superior to those of conventional sintered AT materials shown in Comparative Examples, and have very high heat cycle durabilities (strength deterioration is 0% or less and dimensional change is 0.3% or less, in all the cases).

The present aluminum titanate ceramic which is a sintered AT material, has superior casting property and high heat cycle durability, and is suitably used as a casting material for metal, for example, a head port liner in a gasoline engine, and also as an engine head port material. Thus, it has an industrial utility.

TABLE 5

| | Comparative Example | | | |
|---|---|---|---|---|
| | 1 | 2 | 3 | 4 |
| Raw materials | | | | |
| Al$_2$O$_3$ source | α-Alumina | α-Alumina | α-Alumina | α-Alumina |
| TiO$_2$ source | Rutile | Rutile | Rutile | Rutile |
| Al$_2$TiO$_5$ source | A | A | A | A |
| SiO$_2$ source | Silica glass | Silica glass | Silica glass | Silica glass |
| Fe$_2$O$_3$ source | — | — | — | — |
| MgO source | Magnesite | Magnesite | Magnesite | Magnesite |
| Rare earth source | Ce$_2$O$_3$ | Pr$_6$O$_{11}$ | Nd$_2$O$_3$ | Sm$_2$Cl$_3$ |
| Mullite source | Mullite | Mullite | Mullite | Mullite |
| Composition (% by weight) | | | | |
| Al$_2$O$_3$ | 57 | 57 | 57 | 57 |
| TiO$_2$ | 36 | 36 | 36 | 36 |
| SiO$_2$ | 6 | 6 | 6 | 6 |
| Fe$_2$O$_3$ | 0 | 0 | 0 | 0 |
| MgO | 0.5 | 0.5 | 0.5 | 0.5 |
| RE$_2$O$_3$ | 0.5 | 0.5 | 0.5 | 0.5 |
| TiO$_2$ particle size D$_{50}$ (μm) | 0.2 | 0.2 | 0.2 | 0.2 |
| Al$_2$TiO$_5$ particle size D$_{50}$ (μm) | 1.0 | 1.0 | 1.0 | 1.0 |
| Sintering temperature (°C.) | 1500 | 1500 | 1500 | 1500 |
| Rare earth crystalline phase | Vitreous phase | Vitreous phase | Vitreous phase | Vitreous phase |
| Breaking strain ($\times 10^{-3}$) | 5.6 | 5.8 | 5.8 | 5.4 |
| 4-Point bending strength (Kgf/mm$^2$) | 2.1 | 2.3 | 2.5 | 2.6 |
| Heat cycle dimensional change (%) | 0.41 | 0.51 | 0.67 | 0.48 |

TABLE 5-continued

|  | Comparative Example | | | |
|---|---|---|---|---|
|  | 1 | 2 | 3 | 4 |
| Heat cycle strength deterioration (%) | 11 | 8 | 15 | 10 |

TABLE 6

|  | Comparative Example | | |
|---|---|---|---|
|  | 5 | 6 | 7 |
| Raw materials |  |  |  |
| $Al_2O_3$ source | α-Alumina | α-Alumina | α-Alumina |
| $TiO_2$ source | Rutile | Rutile | Rutile |
| $Al_2TiO_5$ source | A | B | — |
| $SiO_2$ source | Silica glass | — | — |
| $Fe_2O_3$ source | — | Red iron oxide | — |
| MgO source | Magnesite | Silica glass | $MgCO_3$ |
| Rare earth source | — | $Y(NO_3)_3$ | $Y_2O_3$ |
| Mullite source | Mullite | Kaolin | — |
| Composition (% by weight) |  |  |  |
| $Al_2O_3$ | 57.3 | 56 | 48.8 |
| $TiO_2$ | 36.2 | 20.5 | 47.4 |
| $SiO_2$ | 6 | 14 | — |
| $Fe_2O_3$ | 0 | 8 | — |
| MgO | 0.5 | — | 2.0 |
| $RE_2O_3$ | 0 | 1.5 | 1.8 |
| $TiO_2$ particle size $D_{50}$ (μm) | 0.2 | 40 | 0.4 |
| $Al_2TiO_5$ particle size $D_{50}$ (μm) | 1.0 | 40 | — |
| Sintering temperature (°C.) | 1500 | 1500 | 1500 |
| Rare earth crystalline phase | — | $Y_2O_3$ | $Y_2Ti_2O_7$ |
| Breaking strain ($\times 10^{-3}$) | 6.1 | 4.8 | 4.1 |
| 4-Point bending strength (Kgf/mm$^2$) | 2.0 | 1.4 | 2.8 |
| Heat cycle dimensional change (%) | 0.72 | 8.5 | 0.63 |
| Heat cycle strength deterioration (%) | 22 | 54 | 19 |

What is derived is:

1. An aluminum titanate ceramic comprising: 40–60% by weight of $Al_2O_3$, 30–45% by weight of $TiO_2$, 1–10% by weight of $SiO_2$, 0–4% by weight of $Fe_2O_3$, 0.1–1.5% by weight of MgO and 0.1–10% by weight of $RE_2O_3$, where RE represents Y, Yb, Er, Dy, Ho, Tm or Lu; in the form of a crystalline phase of aluminum titanate and a solid solution thereof, a crystalline phase of mullite and a crystalline phase of rare earth titanate represented by $RE_2Ti_2O_7$.

2. An aluminum titanate ceramic according to claim 1, further comprising at least one crystalline phase of the ceramic selected from rutile and corundum.

3. A process for producing an aluminum titanate which comprises preparing a plurality of raw material powders of 5 μm or less in average particle diameter, consisting essentially of an $Al_2O_3$ source, a $TiO_2$ source, an $SiO_2$ source, an $Fe_2O_3$ source, an MgO source, a rare earth element source, a mullite source and $Al_2TiO_5$ source, mixing the raw material powders to obtain a mixture, shaping the mixture to obtain a shaped body, drying the shaped body to obtain a dried body and then sintering the dried body to obtain an aluminum titanate ceramic comprising 40–60% by weight of $Al_2O_3$, 30–45% by weight of $TiO_2$, 1–10% by weight of $SiO_2$, 0–4% by weight of $Fe_2O_3$, 0.1–1.5% by weight of MgO and 0.1–10% by weight of $RE_2O_3$, where RE represents Y, Tb, Er, Dy, Ho, Tm or Lu, in the form of a crystalline phase of aluminum titanate and a solid solution thereof, a crystalline phase of mullite and a crystalline phase of rare earth titanate represented by $RE_2Ti_2O_7$.

4. A process for producing an aluminum titanate according to claim 3, wherein the raw materials contain the $Al_2TiO_5$ source in an amount of 5% by weight or more based on all the raw materials.

5. A process for producing an aluminum titanate according to claim 3, wherein the raw materials contain the $Al_2TiO_5$ source in an amount of 20% by weight or more based on all the raw materials.

* * * * *